United States Patent
Hakobyan et al.

(10) Patent No.: US 7,706,751 B2
(45) Date of Patent: Apr. 27, 2010

(54) METHOD FOR TRANSMITTING AND RECEIVING DATA WITH LOW BER IN PRESENCE OF INTERFERENCE BETWEEN SUBSCRIBER STATIONS

(76) Inventors: Razmik Hakobyan, 14 Babayan St., Apt. 27, Yerevan, 375037 (AM); Richard D. Bezjian, 50 Frost Rd., Belmont, MA (US) 02478

(*) Notice: Subject to any disclaimer, the term of this patent is extended or adjusted under 35 U.S.C. 154(b) by 1837 days.

(21) Appl. No.: 10/755,716

(22) Filed: Jan. 12, 2004

(65) Prior Publication Data
US 2004/0202200 A1    Oct. 14, 2004

Related U.S. Application Data

(60) Provisional application No. 60/439,602, filed on Jan. 10, 2003.

(51) Int. Cl.
| H04B 1/00 | (2006.01) |
| H04B 15/00 | (2006.01) |
| H04B 1/04 | (2006.01) |
| H04B 1/10 | (2006.01) |
| H04W 4/00 | (2009.01) |

(52) U.S. Cl. .................. 455/63.1; 455/501; 455/502; 455/114.2; 455/296; 370/333

(58) Field of Classification Search ............... 455/410, 455/411, 61, 435.1, 450, 455, 456.5, 456.6, 455/501, 502, 63.1, 114.2, 296, 41.2, 518, 455/517, 63.3, 550.1; 370/313, 326, 330, 370/335, 336, 342–346, 328, 277, 310, 333, 370/350, 341; 375/145
See application file for complete search history.

(56) References Cited

U.S. PATENT DOCUMENTS

| 5,109,393 A * | 4/1992 | Saegusa ................... 375/357 |
| 7,369,571 B2 * | 5/2008 | Choudhury et al. ......... 370/466 |
| 2004/0120304 A1 * | 6/2004 | Kloos et al. ................ 370/347 |

* cited by examiner

*Primary Examiner*—George Eng
*Assistant Examiner*—Nam Huynh

(57) ABSTRACT

Provided is a method for transmitting and receiving data with low BER in presence of interference between subscriber stations. In the method each subscriber station is assigned to its own Unique Address Code (UAC) and to its own Encoded Information Group (EIG). A receiving device first attempts to detect the UAC of a transmitter device by comparing the incoming signal with the receiver's internal Reference Signal (RS). The Number of Continuous Clock Rate Periods (NC-CRP) of the RS, which continuously matches with the incoming signal acts as the criteria for UAC detection. When the measured value of the NCCRP surpasses a Threshold Value of Matches, then the receiving device is synchronized with the transmitter device. Subsequently, the data is separated from interferences by measuring Voltage Hops of the level of the incoming signal at the start and end points of the "0" and "1" bits in the received signal.

3 Claims, 8 Drawing Sheets

US 7,706,751 B2

METHOD FOR TRANSMITTING AND RECEIVING DATA WITH LOW BER IN PRESENCE OF INTERFERENCE BETWEEN SUBSCRIBER STATIONS

RELATED APPLICATIONS

This application claims the benefit of U.S. Provisional Application No. 60/439,602, filed on Jan. 10, 2003. The entire teachings of the above application are incorporated herein by reference.

BACKGROUND

Existing communications systems provide several methods to transmit information. A system, intended to separate channels (subscribers) by frequency, within each subscriber is assigned a unique bandwidth is known as Frequency Division Multiple Access (FDMA). In such a design, the bandwidths should not overlap one another, otherwise they would interfere with one another.

A TDMA (Time Division Multiple Access) system tries to time-share subscribers in an in-sync state while such subscribers work in the same bandwidth. It is crucial in a TDMA system that the time-sharing is separated for each subscriber and should not overlap the existing bandwidths of other subscribers.

FDMA and TDMA systems have the challenge of trying to protect the transmitted data from external interferences. To enable the subscriber to reproduce the useful information transmitted with sufficient accuracy, the level of useful signals must typically be a number of times, such as 4 or 5 times, greater than the level of interference.

Another existing technology includes a multiple access system with code division of subscribers CDMA (Code Division Multiple Access) that uses the spread-spectrum signals. This enables plural subscribers to communicate in the same bandwidth at the same time in case the coding is orthogonal, i.e. the cross correlation is equal to zero.

The signal detection is achieved using the correlation method and the criterion for signal detection is the cross correlation. Hence, these systems have the problem of trying to separate the useful signal from interferences that are non-orthogonal with respect to the useful signal. In other words, due to nonlinear detection of the signal, these existing systems are not well protected from orthogonal interference when the interference level significantly surpass the level of the useful signal.

The ability to send and receive information, maintain its accuracy and security in the presence of orthogonal and non-orthogonal interference are significant challenges. The challenges are further compounded when interference level is significantly more powerful or greater than the useful information signal.

SUMMARY

Particular embodiments of the invention offer a new method which enables solving the problem of creating communication systems with high protection from interference, independent from its origin, i.e. whether the interference is orthogonal or non-orthogonal relatively to the useful signal.

In accordance with the invention, a system for transmitting and receiving information includes a method to communicate information in a plural set of transmitting and receiving subscriber devices or base stations, where a high level of information accuracy is maintained between the transmitting and receiving subscriber devices and stations, amidst the presence of interferences. These requirements are especially important in a medium of wireless communications where the number of subscribers and transmitters increase in numbers and become more dense and transmitting more signal power, or over wired networks, or inside apparatus and electronics board and circuitry, or for special-purpose and defense technology communication systems.

An aspect of the invention can include communications system for transmitting and receiving information, comprising a communication medium coupling a plurality of nodes such that information can be exchanged between the nodes, a first node coupled to the communication medium. The first node including an encoder for encoding digital data using a unique encoding pattern and a transmitter for sending the encoded digital data over the communication medium using a unique address code; and a second node coupled to the communication medium. The second node including a receiver responsive to the unique address code for receiving the encoded digital data from the medium and a decoder for extracting the digital data using the unique encoding pattern.

Another aspect of the invention can include a method for transmitting and receiving information, which provides the separation of the useful signal from the interference with low BER, independent from it's origin, i.e. whether the interference is orthogonal or non-orthogonal relatively to the useful signal.

A unique address of the subscriber, also referred to hereinafter as "Unique Address Code" (UAC) (number of a subscriber) and the unique code are used to encode the information "1" bits, also referred to hereinafter as "Encoded Information Group" (EIG), are assigned to each subscriber's device. The Unique Address Code (UAC) is represented as a binary code, the information is transmitted digitally, each information "1" bit is converted into an Encoded Information Group (EIG) of bits, the Encoded Information Group (EIG) is comprised of a sequence of regularly interchanging "1" and "0" bits with different durations, the number of a subscriber or Unique Address Code (UAC) and the Encoded Information Group (EIG) are unique for each particular subscriber. The Unique Address Code (UAC) signal is a pilot signal and is continually transmitted during the time interval while the actual information is transmitted. The Unique Address Code (UAC) and the actual information are transmitted on the same clock rate. The information signal is placed in the Unique Address Code (UAC) and in the time intervals where the Unique Address Code bits have a "0" value.

For the simplex (one-way) operation, all transmitter devices function in asynchronous transfer mode having the same bandwidth, a clock rate, a Unique Address Code (UAC) and a unique Encoded Information Group (EIG) are assigned to each transmitter device. The unique Address Code (UAC) and the actual information are simultaneously transferred by all transmitter devices on the same carrier frequency (to initiate a wireless communication).

For receiving the information in the simplex operation, the receiver device that receives the information is tuned-in to the Unique Address Code (UAC) as well as to the Encoded Information Group (EIG) of the corresponding transmitter device. The receiver device attempts to detect the Unique Address Code (UAC) of the corresponding transmitter device. The Number of Continuous Clock Rate Periods, also referred to hereinafter as (NCCRP), of the Reference Signal, also referred to hereinafter as Reference Signal (RS), that continually match that of the incoming signal acts as criterion for address code detection, the Reference Signal (RS) is generated in the receiver device and acts as a copy of the Unique Address Code (UAC) of the transmitter device. A match of the Reference Signal (RS) with the incoming signal is achieved if this match occurs with each of the "1" bits of the Reference Signal (RS) signal, a match can either be perfect or imperfect, a perfect match is when the Reference Signal (RS) matches exactly the incoming signal by phase, an imperfect match is when there is a time delay between the two signals and where such delay is not greater than the duration of "1" bit of the Reference Signal (RS).

For detection of the Unique Address Code (UAC) of the corresponding transmitter device, a Threshold Value of Matches, also referred to hereinafter as (TVM), is assigned to the Number of Continuous Clock Rate Periods (NCCRP). The Number of Continuous Clock Rate Periods (NCCRP), of the Reference Signal that match the incoming signal, is being measured. When the measured value (as a number) of the Number of Continuous Clock Rate Periods (NCCRP) exceeds the assigned number of the Threshold Value of Matches (TVM), then the Reference Signal Generator (RSG) of the receiver device is synchronized with the Reference Signal Generator (RSG) of the transmitter device, synchronization is being performed by the Unique Address Code signal.

Furthermore, the Reference Signal Generator (RSG) of the receiver device is synchronized with the Reference Signal Generator (RSG) of the transmitter device. A channel (or in the case of a software driven apparatus, a software control code is executed) in the receiver device opens to receive and process the actual information. The useful signal is separated from interferences. The separation of the useful signal from impulse interferences and similarly from interferences caused by different transmitter devices, is achieved by measuring the relative changes (voltage hopping) of the level of the incoming signal at the starting and ending instances of "1" bits of the Encoded Information Group (EIG), i.e. as the Reference Signal Generator (RSG) of the receiver device and transmitter device are synchronized the receiver device knows at what instances the information bits ought to be, and by following the elevations and drops (Voltage Hops) that take place at the stat and end points of the "1" bits it finds the signal it needs. The separation of the useful signal from harmonic (such as sign, cosign etc. based signals) interferences is achieved by deducting the level of harmonic interferences from the incoming signal, the level (voltage) of harmonic interferences is detected in the instances of "0" bits of the Encoded Information Group (EIG), since as the RSG of the receiver device and the transmitter device are synchronized, the receiver device knows at what instances the "0" bits of Encoded Information Group (EIG) ought to be, in the instances of "0" bits of Encoded Information Group (EIG), the useful signal is constantly equal to zero. Consequently, the useful signal, separated from noise and interferences, enters the receiver's registering device.

For a two-way wireless communication (duplex operation) between a base station and at subscriber unit or between two separate subscribers, two frequencies such as f1 and f2, are supplied to transmit and receive information, all subscribers work on these two frequencies f1 and f2. Under inactive status, all subscribers tune in and listen to detect their own Unique Address Codes (UAC)s and their unique Encoded Information Group (EIG) in the incoming signal. A search, conducted on the same frequency, say, f1 attempts to detect the availability of its Unique Address Code (UAC) in the incoming signal.

Furthermore, in a two-way communication, subscriber A attempts to connect to subscriber B, then subscriber A switches over to the Unique Address Code (UAC) and the Encoded Information Group (EIG) of subscriber B. First, subscriber A operating on frequencies f1 and f2, attempts to detect the availability of the Unique Address Code (UAC) of subscriber B, if the Unique Address Code (UAC) is available, then subscriber B is considered to be busy. While subscriber B is busy, the device of subscriber A deliberately blocks its own transmitter device and the receiver's registering device, to disable subscriber A from receiving information (which is not intended for subscribe A) from subscriber B, and similarly to not transmit information to subscriber B.

Furthermore, whenever subscriber B becomes free as detected by the absence of subscribe B's Unique Address Code (UAC), then subscriber A switches its own transmitter device over to frequency f1, and the receiver device to frequency f2. On the carrier frequency f1, subscriber A transmits the Unique Address Code (UAC) of subscriber B. When subscriber B detects its Unique Address Code (UAC), it opens a channel to receive (or in the case of a software driven apparatus a software control code is executed) the actual information. Subscriber B synchronizes the Generator of the Reference Signal (RSG) of its own transmitter device and receiver device with the Reference Signal RSG of the transmitter device of subscriber A. Simultaneously subscriber B tunes its transmitter device to the frequency f2 and transmits its Unique Address Code (UAC). While detecting the Unique Address Code (UAC) of subscriber B, subscriber A's receiver device opens a channel to receive information, the Unique Address Code (UAC) of subscriber B, detected by subscriber A, implies that a direct communication between subscribers A and B is now possible and enabled, hence enabling the information exchange. (In duplex operation, the Unique Address Code (UAC) detection process and the separation of the useful signal from interferences and noise is achieved exactly in the same way as in simplex operation).

Still further, in duplex operation, when subscriber A initiates the communications, the Reference Signal Generator (RSG) of both the transmitter and receiver devices of subscriber B is synchronized with the Reference Signal Generator (RSG) of the transmitter device of subscriber A, the Unique Address Code (UAC) signal received by subscriber A will time-delay behind the signal of the Reference Signal Generator (RSG) of Subscriber A's transmitter device, the amount of the time delay will depend on the physical distance between subscriber A and B, subscriber A measures the amount of the time delay of the received signal. The distance between subscribers A and B is computed from the amount of the time delay between the two signals. The speed that subscriber A moves relative to subscriber B is computed from the changes of the amount of the time delay between the two signals; the directional aerial (antenna) of subscriber A determines the direction of location of subscriber B. The coordinates of subscriber B's location are computed from the measured direction of location of subscriber B as well as from the amount of the time delay between the two signals. When subscriber B is in motion, then subscriber A is able to determine the distance, coordinates, trajectory and the speed at which subscriber B is moving relative to subscriber A, these properties are computed from the measured value of direction and amount of time delay between the two signals and also from the measured value of changes of the amount of the time delay between the two signals. When the subscriber B is not moving, then subscriber A is able to determine its own location, coordinates, trajectory and speed.

A strong interference is simultaneously and intentionally transferred along with the useful information, to maintain the security of the transmission, consequently preserving the confidentiality of the transferred information. Hardware and software necessary to create noise or random signals are added to or coupled with the useful information being transmitted.

Furthermore, to initiate a wireless communication, the Unique Address Code (UAC) signals and information signals are both transformed to radio signals. In particular, the Unique Address Code (UAC) signals and the information signals are transmitted on the same carrier frequency, various types of modulation PSK, FSK, ASK etc. may be applied.

Another aspect of the invention can include communication systems for transmitting and receiving information, that includes transmitter device for transmitting information. The transmitter device comprises an analog-to-digital converter for converting information of the analog signal into a digital code, a Reference Signal Generator (RSG) for converting number of a subscriber into a Unique Address Code (UAC); a device (coder) for encoding "1" bit information into an Encoded Information Group (EIG); a device for arranging an information signal in time slots where the Unique Address Code bits have zero value; a device for synchronizing: the Reference Signal Generator; the analog-digital converter; the coder for encoding "1" bit information; and the device for arranging the information signal in time slots where the Unique Address Code bits have zero value, and an adder, for summating the signal information and the Unique Address Code (UAC) signal. Furthermore, to initiate a wireless communication, the transmitter can include a modulator device for modulating the signal information and the Unique Address Code (UAC) signal by the same carrier frequency, various types of modulation PSK, FSK, ASK etc. may be applied, and a power amplifier for amplifying the modulated high-frequency signal; an antenna for transmitting the signal.

Another aspect of the invention can include communication systems for transmitting and receiving information, that includes receiver device for receiving information. The receiver device comprises the Reference Signal Generator (RSG), that generates Reference Signal (RS), that act as a copy of the Unique Address Code (UAC) of the transmitter device a comparator circuit, the threshold level of which changes automatically according to the level and form of the input signal; a multiplier, where the multiplication of the input signal with the reference signal (RS) is produced; a device for measuring the Number of Continuous Clock Rate Periods (NCCRP) of the Reference Signal that match the incoming signal; a signal analyzer that separates the useful signal from noise and interferences; and a device for synchronizing the Reference Signal Generator (RSG) and the signal analyzer with the received signal of the Unique Address Code (UAC).

Furthermore, for processing information the receiver includes a channel for receiving and processing information that opens when the Reference Signal Generator is synchronized with the received signal of the Unique Address Code (UAC); a registering device that receives the useful signal, separated from noise and interferences; and an amplifier and a detector (in a wireless communications) or amplifier (in a wired communications where signals may get weaker during transmission due to distance or otherwise) for amplifying and detecting the input signal; and an antenna.

BRIEF DESCRIPTION OF THE DRAWINGS

The foregoing and other objects, features and advantages of the COMMUNICATION SYSTEM TRANSCEIVER will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
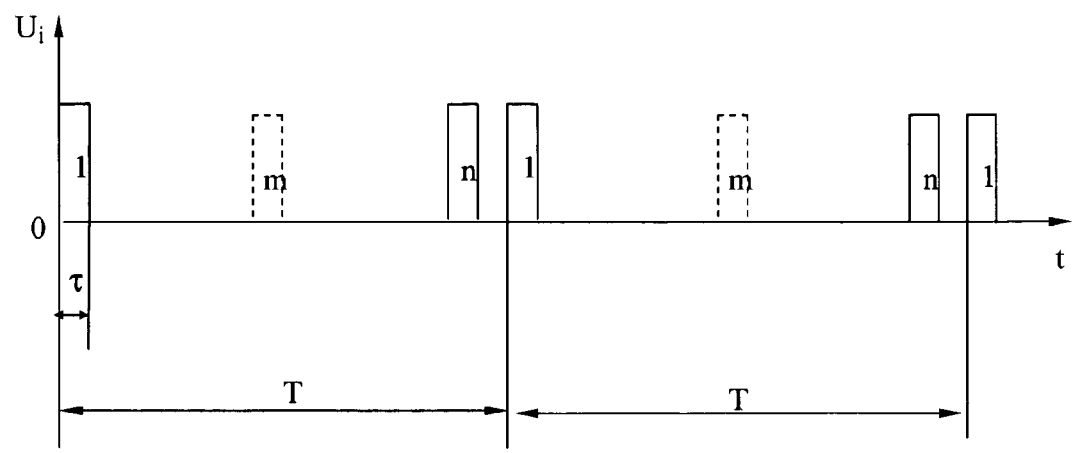
FIG. 1 is a model type view showing an example of signal of Unique Address Code (UAC).

Particular embodiments of the invention relate to information technologies and communications, including transmitting and receiving information. Information is communicated in a plural set of transmitting and receiving subscriber devices or base stations, where a high level of information accuracy is maintained between the transmitting and receiving subscriber devices and stations, amidst the presence of interferences. These requirements are especially important in a medium of wireless communications where the number of subscribers and transmitters increase in numbers and become more dense and transmitting more signal power, or over wired networks, or inside apparatus and electronics board and circuitry, or for special-purpose and defense technology communication systems. The existing systems do not meet the requirements described above. Thus, the challenge is to invent a method, which provides a secure and accurate communications of information in the presence of interferences and noise that are created intentionally or non-intentionally. The solution to the current problem enables the creation of communication systems with higher protection from interferences than existing methods. In particular, the system employs a new method of transmission of information and a special algorithm of signal processing, which enables:

to create communication systems that possess a high protection from interferences;

to separate the useful signal from the interference with low BER independent from whether the interference is orthogonal or non-orthogonal relatively to the useful signal;

to except practically the influence of multipath fading channels;

plural subscribers to simultaneously communicate in asynchronous transfer mode in the same bandwidth with one another or with base stations in wireless or wired setups or in apparatus or circuitry of electronics devices;

to maintain the security of the transmitted useful signal, consequently maintaining the confidentiality of the transmitted information, amidst strong interferences that can concurrently be sent along with the useful signal during the transmission;

to determine the coordinates, trajectory and the velocity of the objects, or other transmitting subscribers where the transmitting device is placed, by using the amount of time delays of the received signal.

Particular areas in which the invention can be embodied include subscribes using cell or mobile phones to communicate with one another, video or audio or data transmissions from antennas or broadcasting stations to subscribes with TVs radio or other receiving devices, transmission of data of any kind in waves that travel through any medium including air, atmosphere, networks or wired connections, hardware devises and circuitry and the channels within such devises where the data travels, transmissions over the Internet and other communication systems.

As the need to transmit data at higher speeds is an important and increasing factor, the ability to send the data more accurately becomes a challenge. For example a particular system provides a new method to transmit audio and video data between different subscribes with appropriate devices, where audio and video information is generally large in size and therefore the ability to transmit such large amounts of data quickly and accurately is a critical desire.

In another application, since mobile or cell phone principles require that as the density or number of users in a specific cell or area around a transmitter increase, the transmitter needs to emit more power into the surrounding atmosphere to properly satisfy the accurate transmission of data to all subscribers. A real side effect of such environments is that the transmission to one subscriber acts as interference to the other subscribes. The problem is compounded as the number of subscribers increase.

Embodiments of the invention can substantially improve the ability to conduct such transmissions at higher accuracy levels and at lower power volumes as lesser power is required to maintain the accuracy of the information due to the method and design of system.

Another application of this invention may take place inside a electronic unit or system. A computer for example has many parts, and data is be transmitted from one device to another very rapidly and accurately, yet due to external or internal circuit factors noise hinders the accurate transmission of data at high speeds. Often devices or systems have to check the received data and resend it in case it was damaged during the previous transmission which results in an overall lower speed of transmission. Embodiments of the invention can enable such electronics systems and similar networks to send and receive data accurately to one another amidst existing high levels of interferences.

The same is true in an office space or environment where users of PCs or computing devices are connected to one another via a local or a wide area network or Internet connections. Embodiments if the invention permit the accurate transmission of data between such users amidst high levels of expected or unexpected interferences.

Furthermore, this method of transmitting information by a communication systems proposes that this can be done in the same bandwidth, accompanied by simultaneous communications between plural autonomous subscribers in asynchronous transfer mode. The separation of subscribers is accomplished by using the address code of the subscriber's Unique Address Code (UAC) and by the code for encoding of information "1" bits (where the information "1" bits is referred to as Encoded Information Group or EIG).

In the submitted method, a Unique Address Code (UAC) and an Encoded Information Group (EIG) are assigned to each subscriber's device, with the intention to encode the information "1" bits. All subscriber devices can function in asynchronous transfer modes and in the same bandwidth. The Unique Address Code (UAC) is represented as a binary code, and it is transferred along with the information. The Unique Address Code signal is a Pilot Signal. The information is transmitted digitally.

The information is transmitted digitally. The information "1" bits are converted into a code. The information "1" bits are transmitted as an Encoded Information Group (EIG) that contain particular number of regularly interchanging "1" and "0" bits with different durations. The Unique Address Code (UAC) signals as well as the information signals each having its own place are simultaneously transmitted on the same clock rate. The information signal is placed in the instances where the Unique Address Code bits have zero values.

FIG. 1 shows an example of a signal of the Unique Address Code (UAC). Here the impulses 1 ... m ... n are the single "1" bits of the Unique Address Code (UAC). The $\tau$ is the duration of a "1" bit of the UAC, and T is the period of clock rate wherein the UAC are transmitted.

Figure 2:
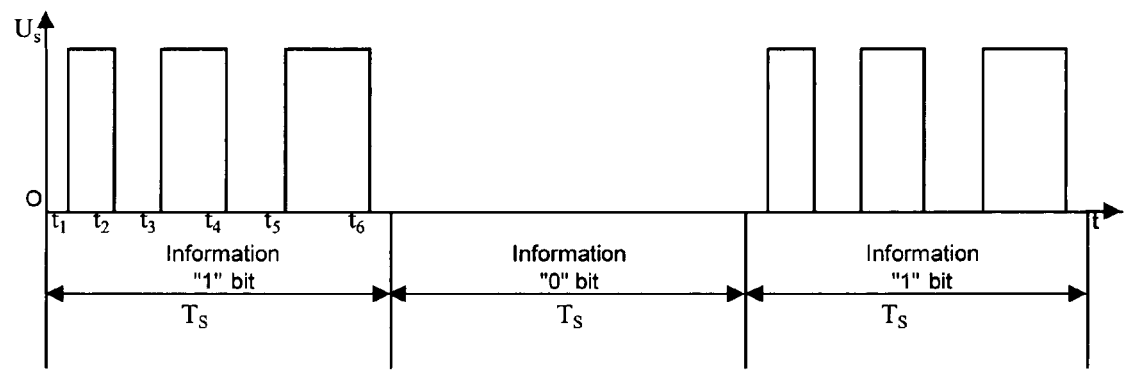
FIG. 2 is a model type view showing an example of the code used to encode information "1" bit (EIG).

FIG. 2 shows an example of one of the information "1" bits as converted into a set of "1" and "0" bits. The information "1" bits are transmitted as an Encoded Information Group (EIG) that contain a specific amount of regularly interchanging "1" and "0" bits with different durations, and therefore $(t2-t1) \neq (t4-t3) \neq (t6-t5) \neq (t3-t2) \neq (t5-t4)$. The Ts is the duration of the Encoded Information Group (EIG).

Figure 3:
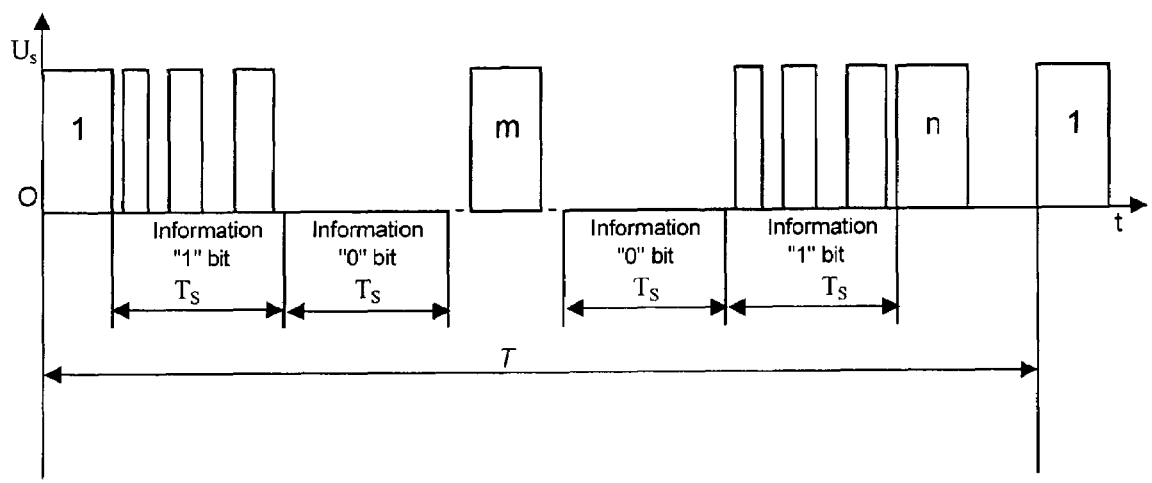
FIG. 3 is a model type view showing an example of signal of information and the Unique Address Code (UAC) transmitted by the transmitter device of a transmitting station and of a subscriber

FIG. 3 shows an example of the signal transferred by the transmitter device. Here the impulses 1 ... m ... n are the single "1" bits of the Unique Address Code (UAC). The T is the duration of a "1" bit of the Unique Address Code (UAC), and the T is the period of clock rate wherein the Unique Address Code (UAC) and the information are transmitted. The Ts is the duration of the Encoded Information Group (EIG). The useful information is transmitted in the time instants where the Unique Address Code bits have "0" values. Each useful bit, herein referred to as an information "1" bit is converted into a code (Encoded Information Group (EIG)).

The Unique Address Code (UAC) of the subscriber and the Encoded Information Group (EIG) are unique for each subscriber. The Unique Address Code (UAC) is continuously transmitted as long as the information is transmitted. The Unique Address Code (UAC) and the information are transferred on the same clock rate (F=1/T). The Unique Address Code signal is a Pilot Signal. In the case of wired communication, the signals of the transmitter devices are transmitted as shown in FIGS. 1, 2 and 3 respectively. To initiate a wireless communication, the Unique Address Code (UAC) signals and information signals are transformed to radio signals. The Unique Address Code (UAC) signal and the information signal are transmitted on the same carrier frequency, various types of modulation PSK, FSK, ASK etc. may be applied.

Figure 4:
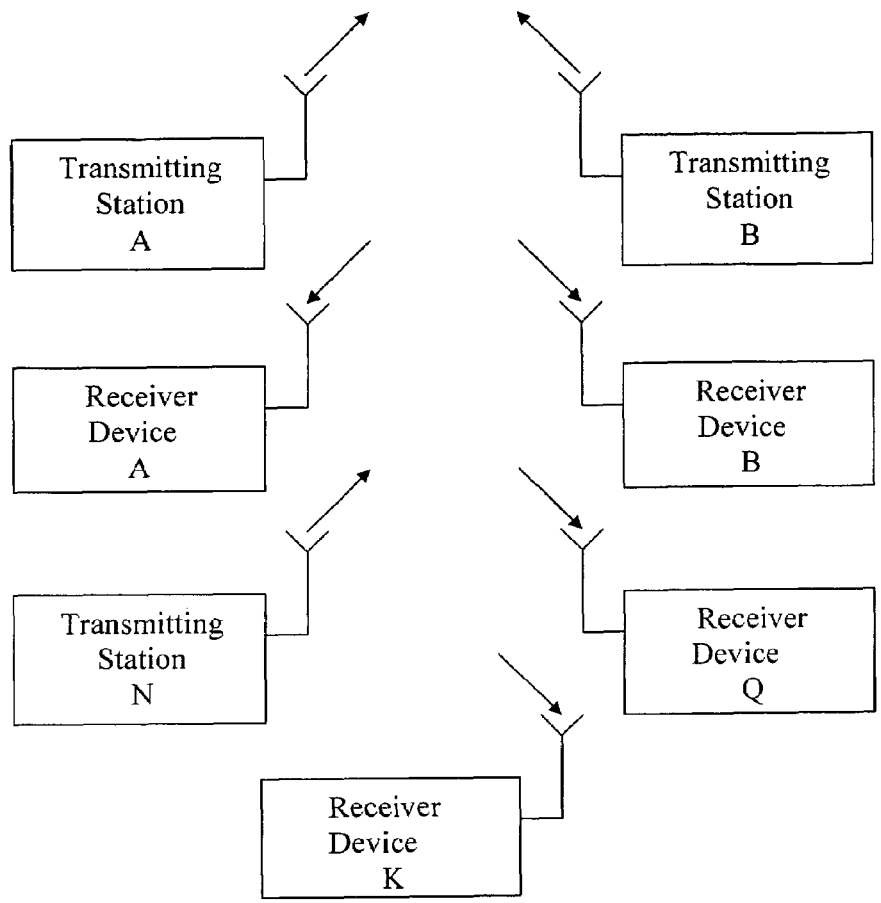
FIG. 4 is a model type view showing an example of the layout scheme of transmitter and receiver devices in the case of simplex (one-way) operation.

FIG. 4 shows an example of the layout scheme of transmitter and receiver devices in the case of simplex (one-way) operation. In such a simplex operation, both the Unique Address Code (UAC) and unique Encoded Information Group (EIG) are assigned to each of the transmitter devices that continually transmit their Unique Address Code (UAC) and the information on the same carrier frequency. The model type view of the Unique Address Code (UAC) and its corresponding Encoded Information Group (EIG) are represented in FIG. 1, FIG. 2 and FIG. 3 respectively. On the same carrier frequency, the transmitter devices transmit the Unique Address Code (UAC) and the information. The transmitter devices are autonomous and they are not synchronized with one another and thus operate separate from one another.

Figure 5:
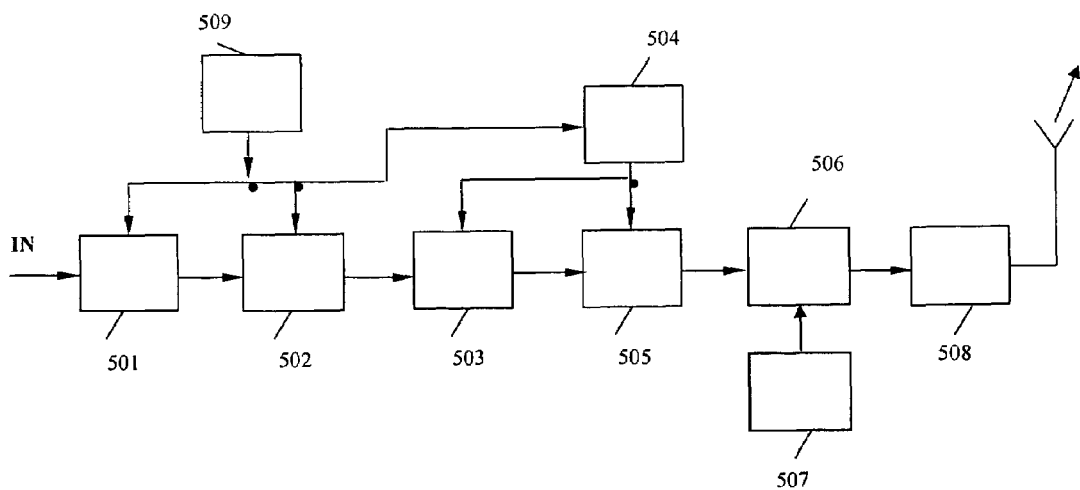
FIG. 5 is a model type view showing an example of the functional scheme of the transmitter device.

FIG. 5 shows an example of a functional diagram of the transmitter. It comprises: analog-to digital converter 501 for converting the analog signal into a digital one; encoder 502 for encoding "1" bit information by EIG (FIG. 2); device 503 for shifting information signal in time slots (FIG. 3), where the Unique Address Code bits have zero value; device 504 that comprises the Reference Signal Generator and converts the number of the subscriber into the Unique Address Code (UAC); adder 505 for summating information and Unique Address Code (UAC) signals; modulator 506 for modulating summating information and Unique Address Code (UAC) signals of the same carrier frequency; generator of the carrier frequency 507; power amplifier 508 and device 509 for synchronizing the work of the separate nodes (501, 502, 503, 504) of the transmitter.

To receive information, the receiver device tunes in to the Unique Address Code (UAC) and the Encoded Information Group (EIG) of the corresponding transmitter device from which the receiver device attempts to receive the information. The receiver device first attempts to detect the Unique Address Code (UAC) of the transmitter device. It compares the incoming signal with the receiver's internal Reference Signal (RS) and conducts a search. The Reference Signal (RS) is generated in the receiver device and acts as the Unique Address Code (UAC) of the transmitter device. A match of the Reference Signal (RS) with the incoming signal is implied if this match occurs with each of the "1" bits of the Reference Signal (RS) signal, such that the time and duration of each of the "1" bits of the Reference Signal (RS) match completely or in parts with the "1" bits of the incoming signal.

A match can either be perfect (complete) or imperfect (in parts). A perfect match is implied if the Reference Signal (RS) matches the incoming signal by phase. An imperfect match is implied if the timeline length of the time delay between the two signals is not greater than the duration of "1" bit of the Reference Signal (RS).

A Threshold Value of Matches (TVM) is set for the Number of Continuous Clock Rate Periods (NCCRP). An internal counter and measuring device continuously measures the Number of Continuous Clock Rate Periods (NCCRP).

Figure 6:
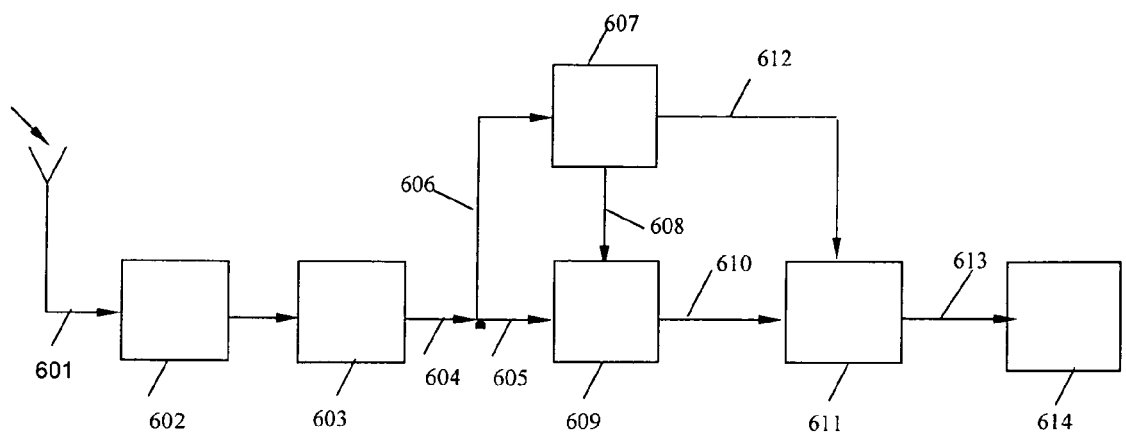
FIG. 6 is a model type view showing an example of the functional scheme of the receiver device, where the signal is processed.

FIG. 6 shows the functional diagram of the receiver device. Here the incoming signal 601 is amplified by the amplifier 602, is detected by the detector 603, after on the outgoing signal 604 of the detector 603 is divided into channels 605 and 606. The signal of channel 606 enters the address detector 607. Herein the incoming signal is compared with the Reference Signal (RS) with the intention to detect the availability of the Unique Address Code (UAC) of the corresponding transmitter device in the incoming signal. The Reference Signal (RS) is generated in the address detector 607 and acts as the Unique Address Code of the corresponding transmitter device.

In previous communication systems that use code division of subscribers, the challenges of signal detection are resolved by correlation processing. The cross correlation between the incoming signal and the Reference Signal (its unique spreading code) serves as criterion for signal detection of the correlation processing. The cross correlation equals to zero, when the incoming signal is orthogonal to the Reference Signal and differs from zero, when they are no orthogonal. Any value surpassing the threshold value of matches in the cross correlation is regarded as a useful signal. Therefore, the correlation method is unable to distinguish the useful signal from signals that are non-orthogonal relative to the useful signal. The correlation method is also unable to distinguish the useful signal from the interferences that are created by random fluctuations of noise and interferences, which are produced out of the combination of signals, and which are orthogonal relative to the useful signal. Therefore existing CDMA systems have above foregoing disadvantages.

A particular embodiment of the invention employs a special algorithm of signal processing. This method eliminates the disadvantages of the correlation methods. Specifically, the Number of Continuous Clock Rate Periods (NCCRP) within the match of the incoming signal with the Reference Signal (RS) acts as the criterion for Unique Address Code (UAC) detection.

With the goal of detecting the Unique Address Code (UAC) of the transmitter device, in the address detector 607 (FIG. 6) the incoming signal is deliberately compared with the Reference Signal (RS). The Reference Signal (RS) is generated in the address detector and acts as the Unique Address Code (UAC) of the transmitter device. The Number of Continuous Clock Rate Periods (NCCRP), within the incoming signal that matches with the Reference Signal (RS), is measured in the address detector 607.

Figure 7:
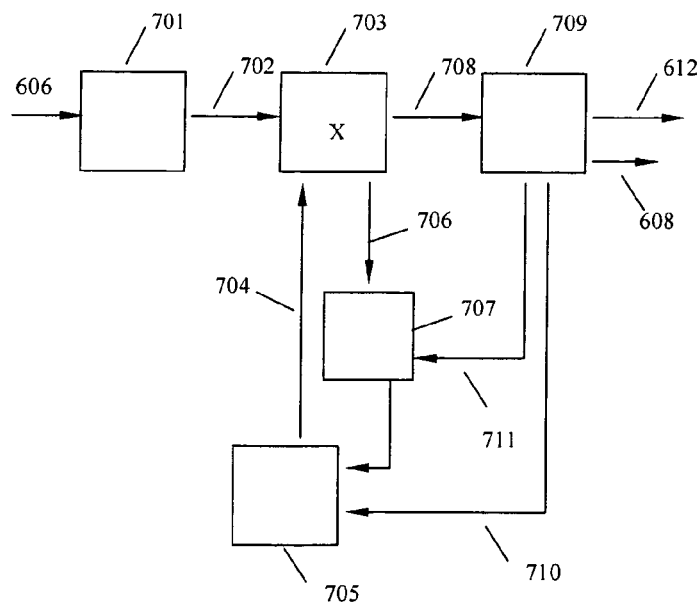
FIG. 7 is a model type view showing an example of the functional scheme of the address detector.

FIG. 7 shows an example of a functional diagram of the address detector. The search, the detection of the address of the transmitter device, the measurement of the Number of Continuous Clock Rate Periods (NCCRP) and the synchronizing of the Reference Signal Generator with the transmitter device are performed in the Address Detector. It comprises: the comparator circuit 701; the multiplier 703, where the multiplication of the input signal with the reference signal (RS) is produced; the Reference Signal Generator (RSG) 705, which produces a signal being the copy of the code of the transmitter device address; measurer 709 for measuring of the Number of Continuous Clock Rate Periods (NCCRP) and the canal 707, by which a signal for synchronizing the Reference Signal Generator with the transmitter device is transmitted.

In the Address Detector the signal 606 (see FIG. 6 and FIG. 7) enters the comparator circuit 701. The threshold level of the comparator circuit changes automatically according to the level and form of the input signal. The output signal 702 of the comparator circuit enters the multiplier 703, where the multiplication of the input signal with the Reference Signal (RS) is produced. The Reference Signal 704 is produced in the Reference Signal Generator (RSG) 705. The output signal 708 of the multiplier enters the measurer, where the measuring of the Number of Continuous Clock Rate Periods (NCCRP) is done.

Figure 8:
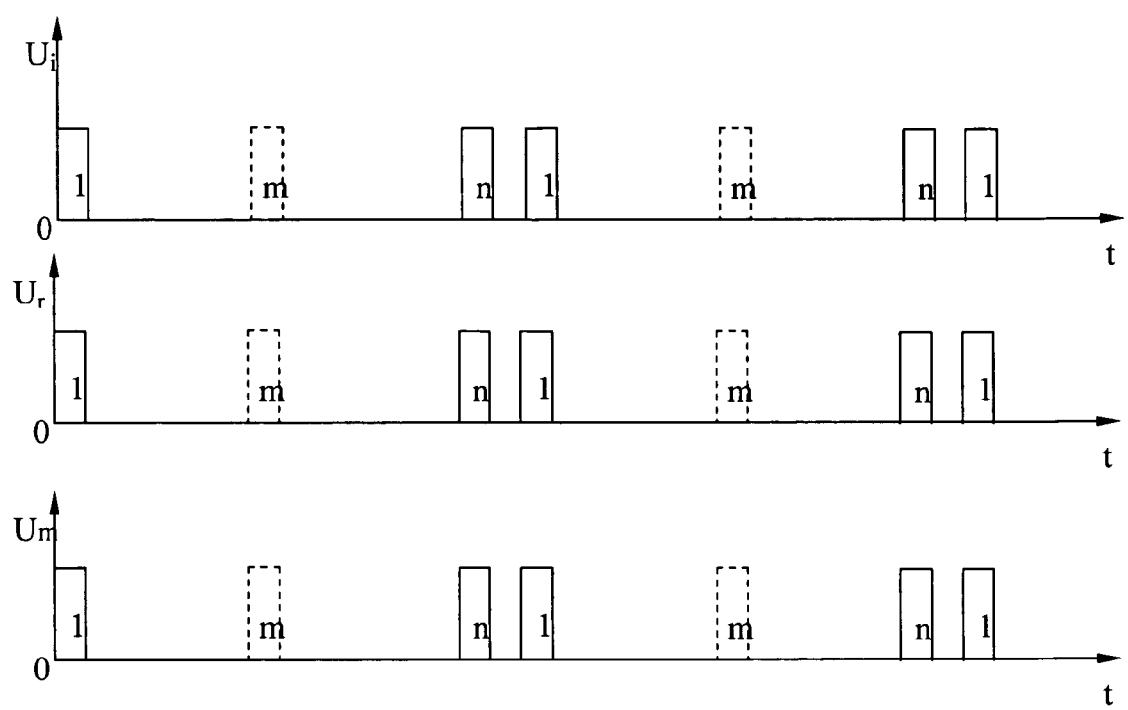
FIG. 8 is a model type view showing an example of the incoming signal that matches exactly with the (RS) by phase.
Figure 9:
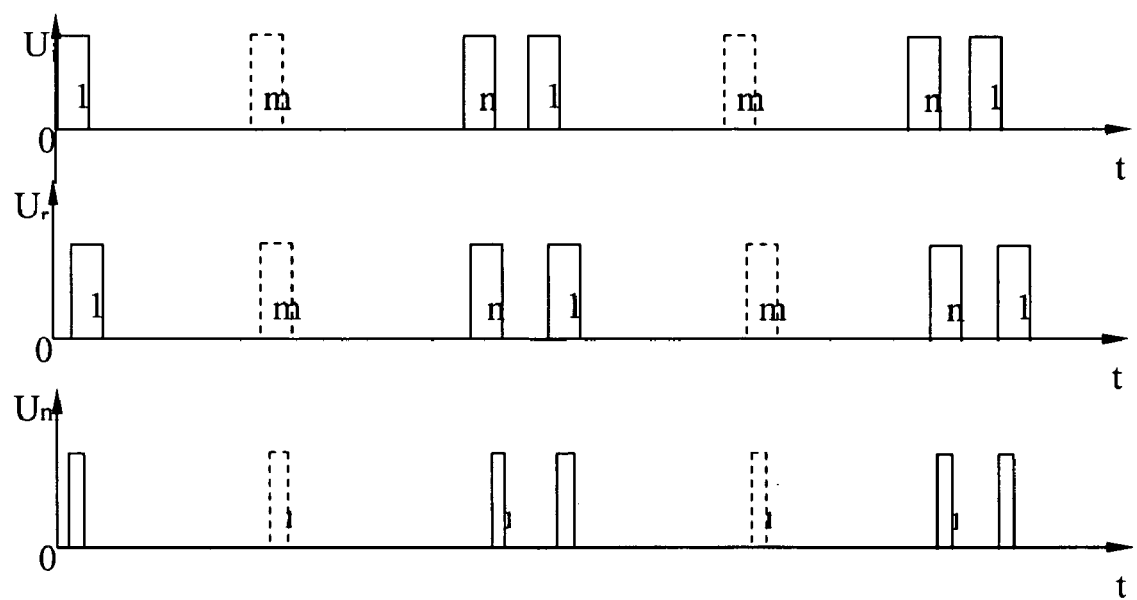
FIG. 9 is a model type view showing an example of the incoming signal that matches the Reference Signal (RS) with a time delay between the two signals.

First in the address detector a search is being conducted with the purpose to detect the address of the corresponding transmitter device. The search is done with the pitch (0.5-0.8) τ, where the τ is the duration of a "1" bit of the Reference Signal (RS). Such a match is implied if this match occurs with each of the "1" bits of the Reference Signal (RS). A match can be either perfect or imperfect. A perfect match is implied if the Reference Signal (RS) matches with the input signal by phase. The model portrayed in FIG. 8 shows Ui as the input signal, Ur as the Reference Signal in the receiver device and Um as output signal of the multiplier. This is an example of a perfect match of the two signals by phase. An imperfect match is implied, if the amount of the time delay between the two signals is not greater than the duration of "1" bit of the Reference Signal (RS). The model portrayed in FIG. 9 shows the example of an imperfect match of the input signal with the Reference Signal (RS), where there is a time delay between the two signals. In the case of the imperfect match of the signals, the durations of the impulses in the output of the multiplier may differ depending on the level of interference.

In the case of the matching of the input signal with the Reference Signal, the search of the transmitter device is interrupted and the measuring of the Number of Continuous Clock Rate Periods (NCCRP) is processed. The interrupting of the search of the address is done with the signal 710.

There's permanently a shift between the two signals if they are not yet synchronized. Over a period of one clock rate, the signal with the Unique Address Code (UAC), transmitted by the transmitter device, is shifted relative to the Reference Signal (RS) of the receiver device and is defined as the Difference in Time or Delta T, where Delta T is:

$$\Delta T = T_T - T_R \quad (1)$$

where $T_T$ and $T_R$ represent the time of one clock rate period of the transmitter device and of the Reference Signal (RS), correspondingly.

Hence, the Number of Continuous Clock Rate Periods (NCCRP), within the incoming signal match with the Reference Signal (RS) so that:

$$N = 2\tau / |\Delta T| \quad (2)$$

Since $T_T - T_R$ can be positive or negative, as the time shift can be either before or after the Reference Signal, $|\Delta T|$ is the absolute value of this time shift, $2\tau$ is the time length of one "1" bit of the Unique Address Code (UAC) multiplied by 2.

N represents a Threshold Value of Matches (TVM). When the measured value of the Number of Continuous Clock Rate Periods (NCCRP), in the incoming signal that match (completely by phase and in parts, when the time delay between the signals is not greater than the time length of "1" bit) with the Reference Signal (RS), surpasses the TVM, this suffices that the incoming signal is intended for this receiver device. The Reference Signal Generator of the receiver device is then synchronized with the transmitter device. The synchronization is accomplished with the signal 706 (FIG. 7) that enters the Reference Generator (RSG) 705 by the canal 707. Signal 706 represents the Unique Address Code signal of the transmitter device. Canal 707 opens with signal 711.

The (2) shows that the detector will detect only the signals that contain the Unique Address Code (UAC) of the corresponding transmitter device. The clock rate of the detected signals differs from that of the Reference Signals and is not greater than:

$$\Delta F = 2F_R / MN \quad (3)$$

where
$F_R = 1/T_R$ shows the clock rate of the Reference Signal (RS);
$M = T_R/\tau$ shows the total number of "0" and "1" bits of the "Reference Signal (RS)" in one clock rate period.

The (3) shows the preferred condition when the Threshold Value Of Matches ($N_{TV}$) of the Number of Continuous Clock Rate Periods (NCCRP), within the incoming signal matches with the Reference Signal (RS):

$$N_{TV} > 2F_R / M \quad (4)$$

In other words, if the conditions of (4) are met, then practically we get the signals that we want i.e. the Unique Address Code (UAC) of the transmitter device.

In such a case, the address detector 607 (FIG. 6) will actually detect only the incoming signals that contain the Unique Address Code (UAC) of the corresponding transmitter device. The clock rate of the detected signals will actually be equal to the clock rate of the Reference Signal (RS) ($\Delta F < 1$).

Thus, the address detector will only detect the incoming signals that act as the Unique Address Code (UAC) of the corresponding transmitter device, and will not be able to detect other signals not intended for itself. Therefore, receiver devices not only are able to detect signals intended for them, but furthermore, they are by the inherent designs of this method, able to separate the useful information signal from the prevalent mixture of various signals not intended for them.

Suggested criterion allows detect from a variety of signals exact one that we need. It excludes interference of signals, which orthogonal to useful signal, because for that signals the Number of Continuous Clock Rate Periods (NCCRP) equals to zero. Besides, chosen criterion eliminates the interference of those non-orthogonal signals whose Number of Continuous Clock Rate Periods (NCCRP) with useful signal less than Threshold Value of Matches ($N_{TV}$). Suggested method of detection of address eliminates the influence of combinations both non-orthogonal and orthogonal signals. This explains in terms that these signals are not synchronized with each other and therefore cannot create signal, whose NCCRP stably exceeds $N_{TV}$.

In the simplex mode, upon detecting the availability of the Unique Address Code (UAC) of the transmitter device in the incoming signal, the Reference Signal Generator (RSG) that is part of the address detector 607 (FIG. 6) and which generates the Reference Signal (RS), is synchronized with the Reference Signal Generator (RSG) of the transmitter device. Synchronism is being performed by the Unique Address Code signal. Thereafter, the signal 608 opens a channel 609 (or in the case of a software driven apparatus, a software control code is executed) to receive information. The analyzer, simultaneously with the signal 612, is synchronized with the Reference Signal. Furthermore, the signal of information 610 enters the analyzer 611, where the useful signal will be singled out of interferences.

Here, a new algorithm of separation useful signal from the interference is described which significantly differs from the method of correlation. The separation of the useful signal from impulse or other types of interferences, brought about by different transmitter devices, is achieved by measuring the relative changes (voltage hopping) of the level of the incoming signal at the starting and ending instances of "1" bits of the Encoded information Group (EIG), i.e. as the RSG of the receiver device and transmitter device are synchronized with one another, the receiver device knows at what instances the information bits ought to be. It knows as well that the "1" bit of information varies from "0" bit of information as it is encoded by EIG code. It remains to detect what kind of information bits is being received. If the received information bit appears to be "1", then in the time moments t1, t3, t5 of the information bit there is positive voltage hopping, and in the moments t2, t4, t6 there is negative voltage hopping (see FIG. 10). Starting from this condition all the received information bits are checked in the time moments t1, t2, t3, t4, t5, t6. Those information bits which correspond to the condition mentioned above are considered to be "1" bits, while those information bits which turn not to correspond to this condition are considered to be "0" bits.

Figure 10:
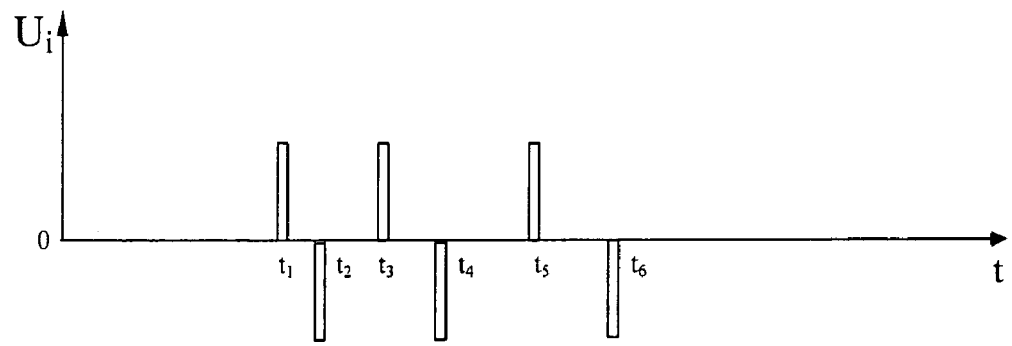
FIG. 10 is a model type view showing an example of the code of information "1" bit at the output from the analyzer.

The model portrayed in FIG. 10 shows an example of the "1" bits of information with relative changes measured for the level of the incoming signal. The presence of positive voltage hopping in the instants t1, t3, t5 and negative voltage hopping in the instants t2, t4, t6 indicate that the information "1" bit is accepted.

The separation of the useful signal from harmonic (such as sign, cosign etc. based signals) interferences is achieved by deducting the level of harmonic interferences from the incoming signal. The level (voltage) of harmonic interferences is detected in the instances of "0" bits of the Encoded Information Group (EIG), since as the RSG of the receiver device and the transmitter device are synchronized, the receiver device knows at what instances the "0" bits of Encoded Information Group (EIG) ought to be. In the instances of "0" bits of Encoded Information Group (EIG), the useful signal is constantly equal to zero.

Consequently, the useful signal 613, separated from noise and interferences, enters the receiver's registering device 614.

A particular signal processing algorithm allows with high accuracy separate useful signal from interference the level of which greatly surpasses the level of useful signal. This can be explained by the fact, that presence of useful signal is not determined by the measurement of the signal level, but by the fixation of the relative changes (Voltage Hopping) of the level of the incoming signal at the starting and ending instances of "1" bits of the EIG. The values of Voltage Hopping are out of receivers concerns, only level of the Hopping surpasses the fixed level.

A particular signal processing algorithm allows as well with high accuracy separate useful signal from noisy signals and signals from other subscribers. This explains in terms that Encoded Information Group (EIG) has a special form and is different at subscribers. Noisy signals and subscriber's signals can generate combinations, which concur with EIG of given subscriber. Thus, for receiver to consider this combination as "1" bit of information, it is necessary that these combinations were in the same time interval with the transmission of "0" bit of information. This is possible. However the subscribers are working in asynchronous transfer mode abovementioned formations will be unstable and will lead in some extent to worsening of information reception.

Figure 11:
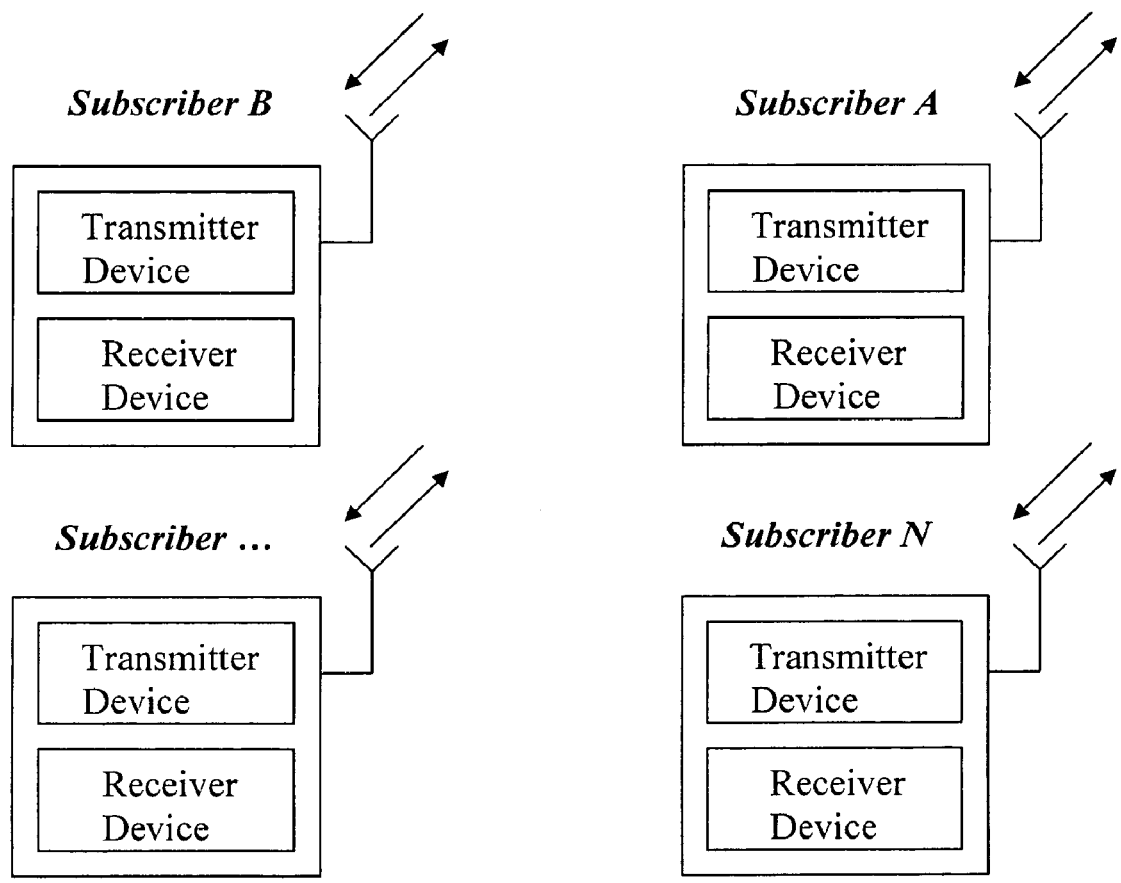
FIG. 11 is a model type view showing an example of the layout scheme of transmitter and receiver devices in the case of the two-way communication (duplex operation).

FIG. 11 shows an example of the layout scheme of transmitter and receiver devices in the case of two-way communication (duplex operation). In the sequence of duplex operation, Unique Address Code (UAC) and the unique Encoded Information Group (EIG) are assigned to each subscriber's device. Two frequencies are being supplied, say, $f_1$ and $f_2$, to transmit and receive information. All subscribers work on the same frequencies $f_1$ and $f_2$. Under inactive status, all subscribers tune in to their own Unique Address Code (UAC) and their own Encoded Information Group (EIG). A search, conducted on the same frequency, say, $f_1$ attempts to detect the availability of their own Unique Address Code (UAC) in the incoming signal.

When subscriber A attempts to connect to subscriber B, then subscriber A switches over to the Unique Address Code (UAC) and the Encoded Information Group (EIG) of subscriber B. First, the receiver device of subscriber A conducts intentionally a search on the frequencies $f_1$ and $f_2$, to detect the Unique Address Code (UAC) of subscriber B. If the address code is detected, then subscriber B is considered to be busy. While subscriber B is busy, the subscriber A's device deliberately blocks its own transmitter device and the receiver's registering device. This disables subscriber A to receive information, which is not intended for subscriber A, from subscriber B, and to not transmit information to subscriber B.

When subscriber B is free, as detected by the absence of subscriber B's Unique Address Code (UAC), then subscriber A switches its own transmitter device over to frequency $f_1$, and its receiver device to frequency $f_2$. On the carrier frequency $f_1$, subscriber A transmits the Unique Address Code (UAC) of subscriber B. Subscriber B, after detecting its own Unique Address Code (UAC), synchronizes the its Reference Signal Generator (RSG) of both of its transmitter and receiver devices with the Reference Signal Generator (RSG) of the transmitter device of subscriber A. Synchronization is being performed by the Unique Address Code signal. Following this a channel (or in the case of a software driven apparatus, a software control code is executed) inside the subscriber B opens to receive the transmitted information. Subscriber B concurrently switches its transmitter device over to the frequency f2, and transmits its own Unique Address Code (UAC). The Unique Address Code (UAC) of subscriber B, detected by subscriber A, directly implies an established communication between the two subscribers, hence enabling the information exchange.

In duplex operation, the Unique Address Code (UAC) detection process and the separation of the useful signal from interferences and noise is achieved exactly in the same way as in simplex operation.

In the sequence of duplex operation, when subscriber A initiates the communication, the Reference Signal Generator (RSG) of subscriber B is synchronized with the Generator of the Reference Signal (RSG) of the transmitter device of subscriber A. The Unique Address Code (UAC) signal received by subscriber A will time-delay behind the signal of the Reference Signal Generator (RSG) of the transmitter of subscriber A. The amount of time delay between the signals will depend on the distance between subscriber A and B. The distance between subscribers A and B is computed from the amount of time delay between the two signals. The speed of motion at which subscriber A moves relative to subscriber B is computed from the amount of time delay changes between the two signals. The directional aerial (antenna) located on subscriber A enables to determine the direction of the location of subscriber B. When subscriber B is moving, then subscriber A is able to determine the distance, coordinates, trajectory and the speed of motion with which subscriber B moves relative to subscriber A. These properties are computed from the measured value of direction and time delay between the two signals and also from the measured value of changes of the amount of time delay between these signals. When subscriber B is not moving, then subscriber A is able to determine its own coordinates, trajectory and speed relative to subscriber B.

The submitted method provides a high accuracy level of information reception in the presence of strong interferences. Hence, strong interferences can be simultaneously transferred along with the useful signal. This enhances and maintains the security of the transmission, consequently preserving the confidentiality of the transferred information.

With justification of the developed method of information transmission and algorithm of signal processing, number of devices have been made and examined. Research was carried out in presence of sinusoidal as well as impulse interferences. During simultaneous presence of sinusoidal and impulse interferences, the receiver device in less than 0.1 second performs the search, detects an address of subscriber and gets into synchronism with the transmitter.

Figure 12:
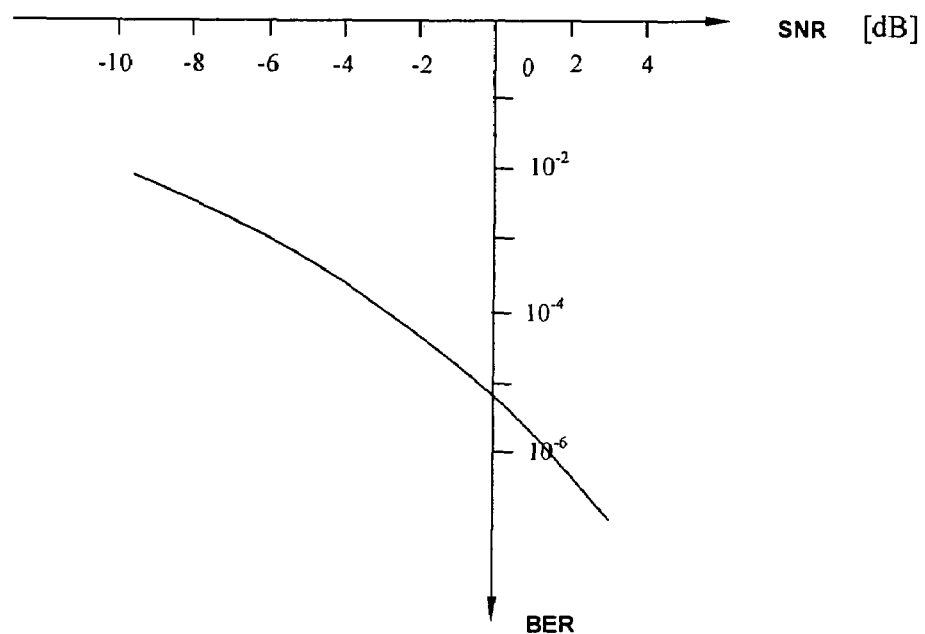
FIG. 12 is a model type view showing an example of the graph of change of "Average Bit Error Rate (BER)" vs. "Signal to Noise (white Gaussian noise) Ratio (SNR)" in dB.

The model portrayed in FIG. 12 shows an example of the change of "Average Bit Error Rate (BER)" vs. "Signal to Noise (white Gaussian noise) Ratio (SNR)" in dB. The graph is based on the experimental research done by the inventor. It shows that the described method provides a high accuracy level of receiving information even if the level of noise significantly surpasses the level of the useful signal.

This signifies that the described method enables to minimize the power needed or emitted by transmitter devices and improve the environment where humans live and operate by reducing the amount of radio waves emitted as well as by simplifying the transmitter device in design. (Along of the requirement to emit less power, than the conventional systems does, this enables to reduce the number of the power amplifiers inside the transmitter devices. This furthers simplification in design of the transmitter device.)

Figure 13:
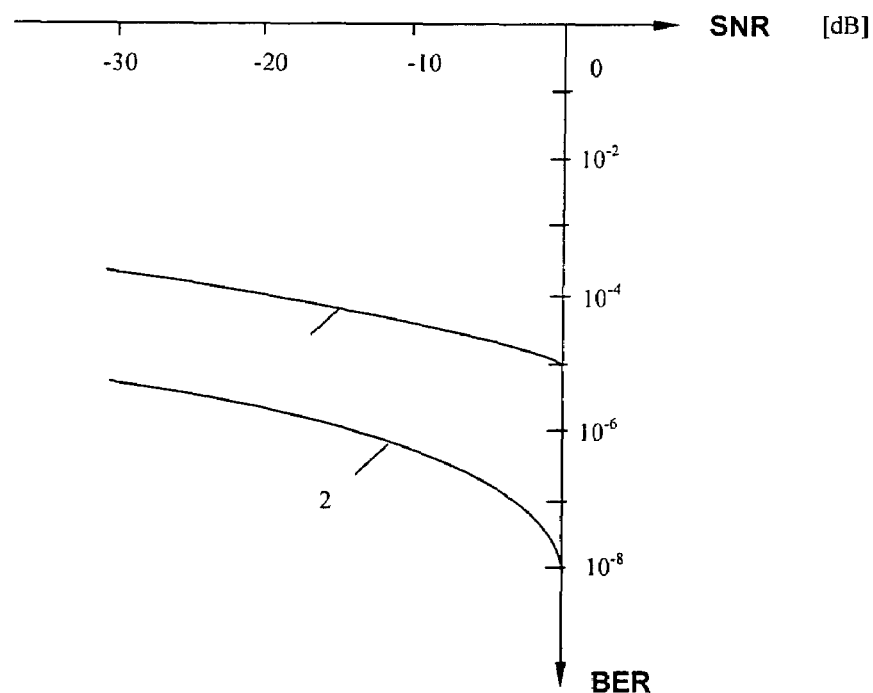
FIG. 13 is a model type view showing an example of the graph of change of "Average Bit Error Rate (BER)" vs. "Signal to Noise (interferences created by other subscribers) Ratio (SNR)" in dB.

The model type view on FIG. 13 shows an example of the change of "Average Bit Error Rate (BER)" vs. "Signal to Noise (interferences created by other subscribers) Ratio (SNR)" in dB. This graph is also based on the experimental research done by the inventor that supports this method. Curve 1 shows an example of the circumstance, when the interference is created by two transmitter devices, which are autonomous and function simultaneously in asynchronous transfer mode in the same bandwidth, where the transmitter device of the useful signal also functions. Curve 2 shows an example of the circumstance, when the interference is caused by one transmitter device that works in asynchronous transfer mode in the same bandwidth that the transmitter device of the useful signal also functions.

This graph indicates that the described method provides a high accuracy level of information reception even if the level of interferences significantly surpasses the level of the useful signal.

The experimental researches and carried out analyses done by the inventor affirm that the described method enables:

- The building of communication systems that provide a high accuracy level to receive information, in the presence of interferences that can be orthogonal or non-orthogonal relatively to the useful signal.
- Plural subscribers to simultaneously communicate in asynchronous transfer mode in the same bandwidth with one another or with base stations.
- Plural subscribers to simultaneously communicate in asynchronous transfer mode in the same bandwidth with one another or with base stations in wireless or wired setups or in apparatus or circuitry of electronics devices.
- To maintain the security of the transmitted useful signal, consequently maintaining the confidentiality of the transmitted information, amidst strong interferences that can concurrently be sent along with the useful signal during the transmission.
- To determine the coordinates, trajectory and the velocity of the objects, or other transmitting subscribers where the transmitting device is placed, by using the amount of time delays of the received signal.

Those of ordinary skill in the art should recognize that methods for a Communication System Transceiver may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment.

What is claimed is:

1. A method for transmitting and receiving data with low Bit Error Rate (BER) in presence of interference between subscriber stations in a wireless communication, where in the presence a group of more than two subscriber stations, transmission can take place between any subscriber station A (SS A) to another subscriber station B (SS B) on a one to one basis, comprising the steps of:

assigning to each SS its own Unique Address Code (UAC), and its own Encoded Information Group (EIG) and also assigning to it two frequencies f1 and f2 to transmit and receive data, where the UAC is represented as a binary code, and the EIG is comprised of a sequence of regularly interchanging "1" and "0" bits with different durations;

tuning a transmitter and receiver of the SS A to the UAC and EIG of the SS B when SS A attempts to connect to SS B;

tuning the SS A's receiver to frequencies f1 and f2, when the SS A attempts to detect the availability of the UAC of the SS B from an incoming signal, if the UAC of SS B is available, then SS B is considered to be busy;

blocking the SS A's own transmitter and receiver's registering device at the SS A, to disable SS A receiving data from SS B, which is not intended for SS A, and similarly to not transmit data to SS B, when SS B is busy;

tuning the SS A's transmitter over to f1, and the SS A's receiver to f2, when SS B becomes free as detected by the absence of the SS B's UAC in the incoming signal;

converting each "1" bit of data to be transmitted to the SS B into the SS B's EIG at the SS A's transmitter;

framing and grouping the SS B's UAC and data at the SS A's transmitter, in a sequence of successive frames, wherein the duration of each frame in the signal is constant;

modulating the said frames on the frequency f1 to initiate a wireless, communication using one of various types of modulation PSK or FSK, or ASK;

transmitting the said modulated frames by SS A's transmitter;

generating at the SS B's receiver an internal Reference Signal (RS) that corresponds to the SS B's UAC, whereby such RS matches and is a copy of the SS B's UAC, and therefore counting at the SS B's receiver the Number of Continuous Clock Rate Periods (NCCRP) that the RS continually matches with the incoming signal;

synchronizing the SS B's receiver and transmitter with the SS A's transmitter, when the number of NCCRP exceeds the Threshold Value of Matches (TVM) number where the TVM number is pre-assigned in the SS B's receiver;

measuring at the SS B's receiver the Voltage Hops of the level of the incoming signal at the starting and ending points of the "0" and "1" bits of the EIG, having established that the SS 'B's receiver and the SS A's transmitter are synchronized and thereby the SS B's receiver knowing at what instances the data bits are to be found, and accordingly;

recovering at the SS B's receiver the data transmitted by the SS A's transmitter from measured values of Voltage Hops by following the rises and drops that takes place at the start and end points Of all the "0" and "1" bits in the received signal;

converting each "1" bit of data to be transmitted to the SS A into the SS B's EIG at the SS B's transmitter;

framing and grouping the SS B's UAC and data in a sequence of successive frames, wherein the duration of each frame in the signal is the same as the SS A's frames durations;

modulating the said frames on the frequency f2 at the SS B's transmitter;

transmitting the said modulated frames by SS B's transmitter.

2. The method for transmitting and receiving data, as claimed in claim 1, further comprising the steps of:

measuring at the SS A's receiver the amount of the time delay of the received UAC signal regarding UAC signal transmitted by SS A;

computing the distance between SS A and SS B from the said measured amount of the time delay between UAC signals transmitted and received by SS A.

3. A method for transmitting and receiving data, as claimed in claim 1, further comprising of:

transmitting simultaneously and intentionally a strong interference along with the data, to maintain the security of the transmission, consequently preserving the confidentiality of the transferred data.

* * * * *